(12) United States Patent
Hikmet et al.

(10) Patent No.: US 10,267,462 B2
(45) Date of Patent: Apr. 23, 2019

(54) HIGH INTENSITY WHITE LIGHT SOURCE

(71) Applicant: SIGNIFY HOLDING B.V., Eindhoven (NL)

(72) Inventors: Rifat Ata Mustafa Hikmet, Eindhoven (NL); Petrus Theodorus Jutte, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/546,208

(22) PCT Filed: Jan. 12, 2016

(86) PCT No.: PCT/EP2016/050426
§ 371 (c)(1),
(2) Date: Jul. 25, 2017

(87) PCT Pub. No.: WO2016/120054
PCT Pub. Date: Aug. 4, 2016

(65) Prior Publication Data
US 2018/0017219 A1 Jan. 18, 2018

(30) Foreign Application Priority Data
Jan. 27, 2015 (EP) .................................. 15152707

(51) Int. Cl.
*F21K 9/64* (2016.01)
*F21V 8/00* (2006.01)
(Continued)

(52) U.S. Cl.
CPC ................ *F21K 9/64* (2016.08); *F21S 41/12* (2018.01); *F21S 41/285* (2018.01); *F21S 45/47* (2018.01);
(Continued)

(58) Field of Classification Search
CPC . F21K 9/64; F21S 41/12; F21S 41/285; F21S 45/47; F21S 48/1127;
(Continued)

(56) References Cited

U.S. PATENT DOCUMENTS 8,616,715 B2 12/2013 Maxik et al.
2001/0007470 A1* 7/2001 Haavisto ................ H04N 9/735
348/223.1
(Continued)

FOREIGN PATENT DOCUMENTS

DE 102008011866 A1 * 9/2009 ........... G02B 27/283
DE 102008011866 A1 9/2009
(Continued)

*Primary Examiner* — Mary Ellen Bowman
(74) *Attorney, Agent, or Firm* — Akarsh P. Belagodu (57) ABSTRACT

A white light source (100) comprising a first light source (102) adapted to emit first light, a reflecting wavelength converting element (108) arranged to receive first light from the first light source (102) and at least partly convert it to converted light, and a second light source (104) adapted to emit blue light which in use combines with the converted light to generate white light. The white light source further comprises a beam shaping element (116) adapted to adjust the intensity profile of the blue light emitted by the second light source (104) to match the intensity profile of the converted light. Thereby, a white light source (104) which generates a high intensity uniform white light with a desired color distribution is provided.

20 Claims, 5 Drawing Sheets

(51) Int. Cl.
*G02B 5/32* (2006.01)
*F21S 41/12* (2018.01)
*F21S 41/20* (2018.01)
*F21S 45/47* (2018.01)
*G02B 27/09* (2006.01)
*G02B 27/10* (2006.01)
*G02B 27/14* (2006.01)
*G02B 27/28* (2006.01)
*G03B 21/20* (2006.01)
*H05B 37/02* (2006.01)
*F21Y 113/10* (2016.01)

(52) U.S. Cl.
CPC .............. *G02B 5/32* (2013.01); *G02B 6/0006* (2013.01); *G02B 27/0927* (2013.01); *G02B 27/1006* (2013.01); *G02B 27/283* (2013.01); *H05B 37/0227* (2013.01); *F21Y 2113/10* (2016.08); *G02B 27/141* (2013.01); *G03B 21/204* (2013.01)

(58) Field of Classification Search
CPC ...... F21S 48/1225; F21S 48/328; G02B 5/32; G02B 6/0006; G02B 27/0927; G02B 27/1006; G02B 27/283; G02B 27/141; H05B 37/0227
See application file for complete search history.

(56) References Cited

U.S. PATENT DOCUMENTS

| | | | |
|---|---|---|---|
| 2005/0270775 A1* | 12/2005 | Harbers | G02B 27/1046 362/231 |
| 2007/0235639 A1 | 10/2007 | Rains | |
| 2013/0308332 A1* | 11/2013 | Woelfing | G03B 21/204 362/553 |
| 2013/0314896 A1 | 11/2013 | Finsterbusch | |
| 2014/0126200 A1 | 5/2014 | Kelchner et al. | |
| 2014/0177262 A1 | 6/2014 | Lai | |
| 2014/0355240 A1* | 12/2014 | Farchtchian | H04N 9/315 362/84 |

FOREIGN PATENT DOCUMENTS

| EP | 2626244 A2 | 8/2013 |
|---|---|---|
| WO | WO2012088454 A1 | 6/2012 |
| WO | WO2014006206 A1 | 1/2014 |

* cited by examiner

HIGH INTENSITY WHITE LIGHT SOURCE

CROSS-REFERENCE TO PRIOR APPLICATIONS

This application is the U.S. National Phase application under 35 U.S.C. § 371 of International Application No. PCT/EP2016/050426, filed on Jan. 12, 2016, which claims the benefit of European Patent Application No. 15152707.4, filed on Jan. 27, 2015. These applications are hereby incorporated by reference herein.

TECHNICAL FIELD OF THE INVENTION

The present invention relates to a white light source and a method for generating white light.

BACKGROUND

High intensity white light sources are interesting for various applications including spots, stage-lighting, head-lamps and digital light projection. One way to provide a high intensity white light source is to make use of so-called light concentrators where shorter wavelength light is converted to longer wavelengths in a highly transparent luminescent material. A rod of such a transparent luminescent material is illuminated by e.g. LEDs to produce longer wavelengths within the rod. Converted light staying in the luminescent material, such as a doped garnet, can then be extracted from one of the surfaces of the rod leading to an intensity gain. However, such a luminescent convertor based light source may be inefficient and obtaining extremely high intensities is not easy. Another method of obtaining high intensity light is to use a high intensity laser beam which is focused on a rotating phosphor wheel. However, the mechanical moving part reduces the reliability of the system. Further, to provide high intensity white light an additional component of blue light may be required.

US patent application 2013/308332 discloses a device for generating white light that includes at least one light source and at least one conversion medium. The light source emits light in the blue and/or ultraviolet spectral range. The light from the light source is generated by a laser and the light from the light source is focused by an optical system onto the conversion medium. The conversion medium converts at least part of the incident light into a different spectral range. In FIG. 7 of US2013/308332, converted light is deflected by a dichroic mirror, so that it may be fed into a light guide. The dichroic mirror is configured to reflect the converted radiation, but to transmit light from said light source. For producing white light, another laser or a blue light source is employed, and the light therefrom is separately fed into the light guide to obtain a blue component in the white light.

SUMMARY

It is a general object of the present invention to provide an improved white light source.

According to a first aspect of the invention, this and other objectives are achieved by a white light source comprising a first light source adapted to emit first light, a reflecting wavelength converting element arranged to receive the first light from the first light source and at least partly convert it to converted light, and a second light source adapted to emit blue light which in use combines with the converted light to generate white light. The white light source further comprises a beam shaping element adapted to adjust the intensity profile of the blue light emitted by the second light source to match the intensity profile of the converted light.

The reflecting wavelength converting element should be understood to receive the first light from the first light source and at least partly wavelength convert the first light into converted light which has a different wavelength. The first light emitted from the first light source may be UV, violet or blue light. A combination of the converted light and the blue light from the second light source results in white light. The wavelength conversion typically converts the first light to converted light having a longer wavelength, such as yellow. The beam shaping element is adapted to adjust the intensity profile of the blue light emitted by the second light source to match the intensity profile of the converted light. The intensity profile of the light is the intensity distribution over a cross section of a beam of the light perpendicular to the direction of the beam of light. By matching the intensity profile of the blue light emitted by the second light source to the intensity profile of the converted light, uniform white light is obtained. In particular, white light having a substantially uniform color point can be obtained to provide a homogenous white beam of light. It is desirable to provide white light having a substantially uniform color point in order to provide high intensity white light without color deviations over the surface of an illuminated area.

The present invention is based on the realization that a white light source generating high intensity uniform white light with a desired color distribution is provided by a white light source comprising a beam shaping element adapted to adjust the intensity profile of the blue light emitted by the second light source to match the intensity profile of the converted light. Thereby, white light is obtained as a combination of the converted light and the beam-shaped blue light from the second light source. The white light generated by the white light source has a substantially uniform color point and can thus provide illumination without substantial color deviation over the surface of an area illuminated by the white light. Further, the color of the white light being generated by the white light source is determined by the amount of converted light which is combined with the amount of blue light from the second source. Hence, by adjusting the amount of converted light, by adjusting the intensity of light from the first light source, or the blue light from the second light source with respect to each other, a color tunable white light source is also provided.

The first light source may emit light in the wavelength range 350-480 nm, and the second light source may emit light in the wavelength range 430-480 nm.

The size of the reflecting wavelength converting element may be configured to match the size of the incoming first light. Configuring the size of the reflecting wavelength converting element to match the incoming light reduces the available volume in which the light may be converted. Thereby, an increase of the etendue in the white light source may be avoided. Etendue is a measure of the size of the light source and the distribution of light coming from the light sources. A low etendue is advantageous in order to obtain a high luminance of the white light source.

In one embodiment of the invention, the white light source may further comprise an optical element adapted to re-direct the first light and blue light, and transmit converted light, and a light exit device. The beam shaping element may be arranged in an optical path between the second light source and the optical element. The white light source may be arranged so that in use the first light emitted by the first light source is re-directed by the optical element to the reflecting wavelength converting element, the converted light is transmitted through the optical element to the light exit device, and the blue light emitted by the second light source is re-directed by the optical element to the light exit device.

In an alternative embodiment, the white light source may further comprise an optical element adapted to re-direct converted light and transmit first light and blue light, and a light exit device. The beam shaping element may be arranged in an optical path between the second light source and the optical element. The white light source may be arranged so that in use the first light emitted by the first light source is transmitted through the optical element to the reflecting wavelength converting element, the converted light is re-directed by the optical element to the light exit device, and the blue light emitted by the second light source is transmitted through the optical element to the light exit device.

Hence, by adapting the optical element to either re-direct or transmit blue light, or to re-direct or transmit converted light different arrangements of the white light source are enabled.

The optical element may be sized such that blue light from the reflecting wavelength converting element is blocked by the optical element from reaching the light exit device. The blue light from the reflecting wavelength converting element may be either reflected or converted blue light. By blocking the blue light from the reflecting wavelength converting element, the light being directed to the light exit device only comprises the converted light from the reflecting wavelength converting element and the blue light from the second light source. The color of the resulting combination of light is easier to control by blocking the blue light which has been reflected or converted by the reflecting wavelength converting element. However, the optical element may also be undersized such that some of the blue light reflected or converted by the reflecting wavelength converting element may pass the optical element.

The optical element may be wavelength selective or polarization selective, or, in at least some instances, both. The optical element may for example be selected from the group consisting of a dichroic reflector, multi-layer reflectors, a mirror filter plate, a grating, a blazed grating, a photonic crystal reflector, a cholesteric reflector, a wire grid polarizer, a reflective polarizer and a polarizing beam splitter.

The white light source may be arranged such that in use the light emitted by the first light source is directed to a first side of the optical element and the blue light emitted by the second light source is directed to a second, opposite side of the optical element.

The beam shaping element may be selected from the group consisting of a lens, a toroidal lens, a lens in combination with a beam shaping prism, a diffractive grating structure, a blazed diffractive grating structure, a diffusor plate, and a holographic diffusor plate.

The white light source may provide a color point variation over a cross section of the generated white light less than 40 sdcm, preferably less than 20 sdcm, more preferably less than 5 sdcm (SDCM stands for Standard Deviation of Color Matching).

The white light source may provide a color rendering index (CRI) of the generated white light of at least 40.

The white light source may provide a correlated color temperature (CCT) of the generated white light in the range of 3000-8000K.

In an embodiment of the invention, the first light source may comprise a plurality of first light sources and the white light source further comprises means for combining light emitted by the plurality of first light sources. By providing a plurality of first light sources the amount of light from the first light source can be increased. Thereby, the amount of light which can be wavelength converted to converted light by the reflecting wavelength converting element can be increased.

The means for combining light may comprise a branched optical fiber arranged in an optical path between the plurality of first light sources and the optical element. The branched optical fiber allows each of the first light sources to be placed apart from each other in order to cool each of them separately. Alternatively, the means for combining light may comprise a first relay lens and a second relay lens arranged in an optical path between the plurality of first light sources and the optical element. The light emitted in use by the plurality of first light sources is coupled into the first relay lens which directs the light to the second relay lens which collimates the light towards the optical element.

The white light source may further comprise a heat sink in thermal contact with the reflecting wavelength converting element. During the conversion process of light to converted light heat is generated. The heat sink avoids a too high temperature increase in the reflecting wavelength converting element during the conversion process.

In one embodiment of the invention, the white light source may further comprise a detector adapted to measure the intensity of the blue light from the second light source and the intensity of the converted light, and means for adjusting the intensity of blue light from the second light source and/or the intensity of the converted light based on the detected intensity. The light sources may degrade over time, the color point of the generated white light can thus be kept constant over the lifetime of the light sources by detecting and adjusting the intensity of the light emitted by the light sources.

The white light source may be incorporated in an automotive headlamp. Alternatively, the white light source may for example be incorporated in a stadium light (e.g. floodlight), a projector, stage light, luminaire or a street light.

According to a further aspect of the present invention, a method for generating white light is also provided. The method comprises the steps of emitting first light from a first light source to a reflecting wavelength converting element, wavelength converting, at least partly, the first light from the first light source with the reflecting wavelength converting element into converted light, emitting blue light from a second light source, and beam shaping the blue light from the second light source to adjust the intensity profile of the blue light emitted by the second light source to match the intensity profile of the converted light. The method further comprises the step of combining the converted light with the beam-shaped blue light from the second light source to generate the white light.

This aspect of the invention may exhibit the same or similar features and/or technical effects as the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing different embodiments of the invention.

DETAILED DESCRIPTION OF THE DRAWINGS

In the present detailed description, embodiments of a white light source according to the present invention are mainly discussed with reference to schematic views showing white light sources according to different embodiments of the invention. It should be noted that this by no means limit the scope of the invention, which is also applicable in other circumstances for instance with other arrangements than the embodiments shown in the appended drawings. Further, that specific components are mentioned in connection to an embodiment of the invention does not mean that those components cannot be used to an advantage together with other embodiments of the invention. The invention will now be described with reference to the enclosed drawings where first attention will be drawn to the structure, and then secondly the function. Like reference numerals refer to like elements throughout.

Figure 1:
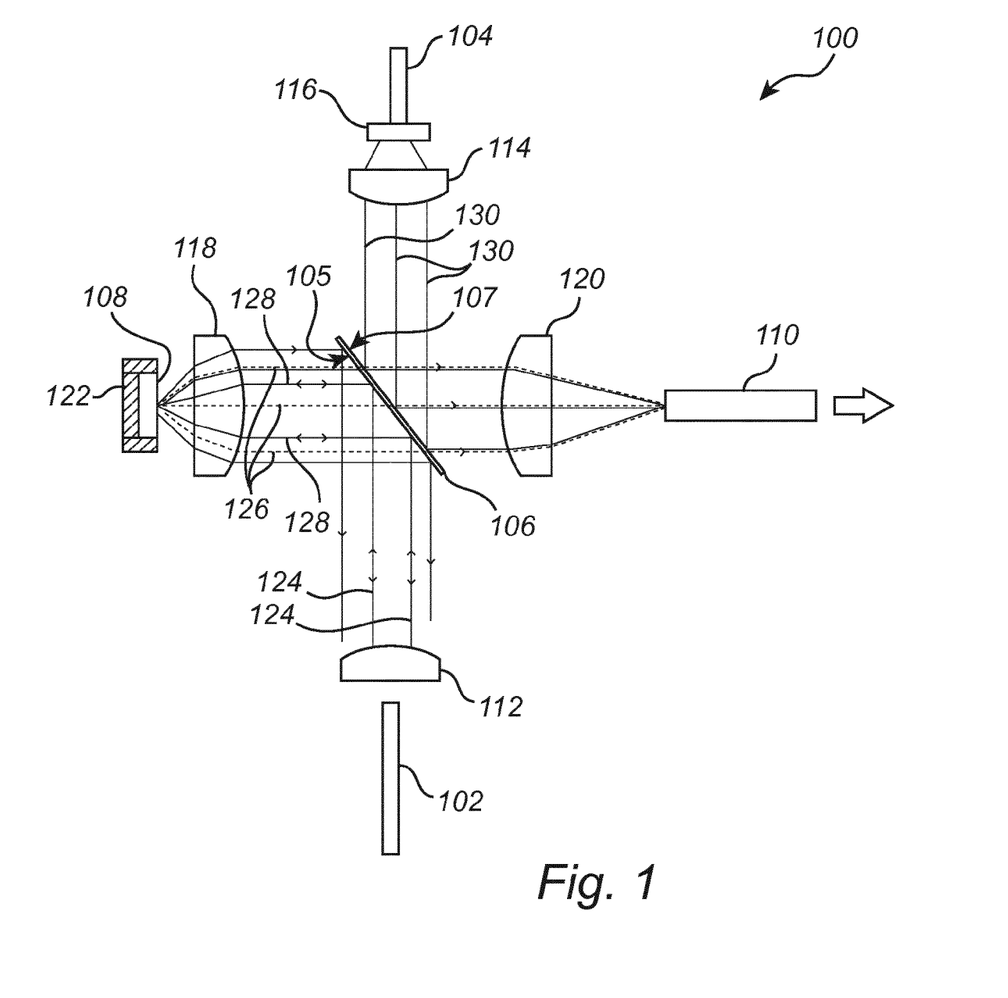
FIG. 1 is a schematic view of a white light source according to one embodiment of the invention.

FIG. 1 shows a schematic view of a white light source 100 according to one embodiment of the invention. The white light source 100 comprises a first light source 102, a second light source 104, an optical element 106, a reflecting wavelength converting element 108, a light exit device 110 and a beam shaping element 116. The white light source 100 of FIG. 1 basically has a cross configuration, with the first and second light sources 102 and 104 being arranged at respective ends of the first (upright) line of the cross, the reflecting wavelength converting element 108 and light exit device 110 being arranged at respective ends of the perpendicular second line of the cross, the optical element 106 being arranged in the center of the cross, and the beam shaping element 116 being arranged in front of the second light source 104.

The first light source 102 and the second light source 104 are preferably solid state light sources such as light emitting diodes, or diode lasers. The first light source 102 emits UV, violet or blue light in a wavelength range of 350-480 nm, and the second light source 104 emits blue light in a wavelength range of 430-480 nm.

The optical element 106 is adapted to re-direct light from the first and the second light source 102,104 and transmit converted light having a different wavelength. The optical element 106 has a first side 105 and a second side 107 opposite the first side. The optical element 106 is arranged between the first light source 102 and the second light source 104 such that first light 124 emitted by the first light source 102 is directed to the first side 105, and blue light 130 emitted by the second light source 104 is directed to the second side 107. The optical element re-directs the first light 124 from the first light source 102 to the reflecting wavelength converting element 108, the re-directed first light from the first light source 102 being indicated by lines 128 in FIG. 1. The optical element 106 further re-directs the blue light 130 from the second light source 104 to the light exit device 110. The optical element 106 shown in FIG. 1 is a dichroic reflector which selectively reflects light smaller than a predetermined wavelength. In this case, the dichroic reflector 106 reflects light with a wavelength below 500 nm, such as the light emitted in use by the first light source 102 and the second light source 104. Light having a wavelength higher than 500 nm is substantially unaffected by the dichroic reflector 106 and thus transmitted through the dichroic reflector 106 from the first side 105 to the second side 107 or the other way around. It is of course also possible to use other optical elements such as a blazed grating, a mirror filter plate, or a polarizing beam splitter to selectively re-direct the light from the first and second light sources 102, 104 and allow light with a longer wavelength to be transmitted through.

It should be noted that it is also possible that the first light 124 from the first light source 102 and the blue light 130 from the second light source 104 will be reflected or re-directed by the same side of the optical element 106. In that case, the first light 124 from the first light source 102 will be reflected by the first side 105 directly, and the light 130 from the second light source 104 is transmitted through the dichroic reflector 106 from the second side 107 after which it will be reflected by side 105. Alternatively, the blue light 130 from the second light source 104 will be reflected by the side 107 directly and the first light from the first light source 102 is transmitted through the side 105 and will then be reflected by side 107.

The reflecting wavelength converting element 108 is arranged to receive the first light 128 emitted by the first light source 102 and re-directed by the dichroic reflector 106. The reflecting wavelength converting element 108 is arranged opposite the light exit device 110 so that the dichroic reflector 106 is arranged between the reflecting wavelength converting element 108 and the light exit device 110. Further, the reflecting wavelength converting element 108 is configured to at least partly convert first light 128 into converted light 126 and to reflect unconverted light 128. The wordings reflect or reflecting should in the context of this application be interpreted as the reflecting wavelength converting element 108 emitting converted light 126 or reflecting blue light 128 which is unconverted. Therefore, the unconverted light and the re-directed blue light from the first light source 102 are both indicated by the lines 128 in FIG. 1. In use, the re-directed light 128 from the first light source 102 enters the reflecting wavelength converting element 108 and is at least partly converted into light having a different wavelength such as e.g. yellow. The converted light 126 and the unconverted light 128 are reflected back from the reflecting wavelength converting element 108 in the direction of the optical element 106. The reflecting wavelength converting element 108 is preferably a phosphor. The thickness and/or concentration of the active component of the reflecting wavelength converting element 108 is configured to maximize the conversion of light from the first light source 102 to converted light. Further, the size of the reflecting wavelength converting element 108 is configured to match the size of the incoming first light 128 in order to prevent the surface of the wavelength converting element 108, which emits converted light, becoming larger than the size of the focal area of the first light 128. In the case that the light from the first light source 102 is blue, the reflected blue light 128 from the reflecting wavelength converting element 108 is redirected by the dichroic reflector 106 towards the first light source 102. In cases where UV or violet light is emitted by the first light source 102 there may also be a blue component present in the converted light 126. In such cases, the blue component of the converted light 126 is also redirected by dichroic reflector 106 towards the first light source 102. The thickness and the activator concentration of the reflecting wavelength converting element 108 determine the extent to which light from the first light source 102 is converted. Converting the first light from the first light source 102 to a large extent so that almost no first light remains is advantageous. In this so called full conversion state system, efficiency can be higher.

Suitable materials used for the reflecting wavelength converting element 108 include inorganic phosphors, such as doped YAG, LuAG, organic phosphors, organic fluorescent dyes and quantum dots. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred, for reasons of environmental safety and concern, to use cadmium-free quantum dots or at least quantum dots having very low cadmium content.

Organic fluorescent dyes may be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The reflecting wavelength converting element 108 may also comprise an inorganic phosphor. Examples of inorganic phosphor materials include, but are not limited to, cerium (Ce) doped YAG (Y3Al5O12) or LuAG (Lu3Al5O12). Ce doped YAG emits yellowish light, whereas Ce doped LuAG emits yellow-greenish light. Examples of other inorganic phosphors materials which emit red light may include, but are not limited to ECAS and BSSN; ECAS being Ca1-xAlSiN3:Eux wherein $0<x\leq1$, preferably $0<x\leq0.2$; and BSSN being Ba2-x-zMxSi5-yAlyN8-yOy:Euz wherein M represents Sr or Ca, $0\leq x\leq1$, $0\leq y\leq4$, and $0.0005\leq z\leq0.05$, and preferably $0\leq x\leq0.2$.

Further, the wavelength converting element 108 material may be made of material selected from the group comprising (M<I>1-x-yM<II>xM<III>y)3(M<IV>1-zM<V>z)5O12- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0\leq x\leq1$, $0\leq y\leq0.1$, $0\leq z\leq1$, (M<I>1-x-yM<II>x,M<III>y)2O3- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0\leq x\leq1$, $0\leq y\leq0.1$, (M<I>1-x-yM<II>xM<III>y)S1-zSez- where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0\leq x\leq0.01$, $0\leq y\leq0.05$, $0\leq z\leq1$, (M<I>1-x-yM<II>xM<III>y)O— where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0\leq x\leq0.1$, $0\leq y\leq0.1$, (M<I>2-xM<II>xM<III>2)O7- where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<=x<=1$, (M<I>1-xM<II>xM<III>1-yM<IV>y)O3- where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0\leq x\leq0.1$, $0\leq y\leq0.1$, or mixtures thereof.

Particularly suitable luminescent materials, however, may be Ce doped Yttrium aluminum garnet (YAG, $Y_3Al_5O_{12}$) and Lutetium-Aluminum-Garnet (LuAG).

During the wavelength conversion of light within the reflecting wavelength converting element 108, energy is dissipated and heat is produced. The white light source 100 therefore further comprises a heat sink 122 arranged in thermal contact with the reflecting wavelength converting element 108 in order to avoid a temperature increase. The heat sink 122 can be in thermal contact with a back surface of the reflecting wavelength converting element 108, and/or the side surfaces of the reflecting wavelength converting element 108 in order to provide a larger area to efficiently cool the reflecting wavelength converting element 108. Thermal contact herein generally refers to thermal conduction. Thermal contact between the heat sink 122 and the reflecting wavelength converting element 108 can thus be effected by three possible scenarios. The first scenario is that the two solid bodies are in physical contact, i.e. the heat sink 122 and the reflecting wavelength converting element 108 are arranged in direct physical contact. The second scenario is that the two solid bodies are arranged in indirect direct physical contact with an intermediate thin layer of a thermal interface material in between. The thermal interface material may for example be glue or another type of material arranged between the heat sink 122 and the reflecting wavelength converting element 108 e.g. in order to fasten the two materials to each other. The third scenario is that the heat sink 122 and the reflecting wavelength converting element 108 are arranged with a thin air gap between them. The air gap should be thinner than approximately 0.2 mm in order to provide thermal conduction instead of forming a thermal barrier.

The light exit device 110, herein embodied by an optical fiber 110, is arranged to receive the blue light 130 from the second light source 104 re-directed by the dichroic reflector 106, and the converted light 126 which is transmitted through the dichroic reflector 106.

Note that the dichroic reflector 106 is also configured with a size such that unconverted light 128 coming from the reflecting wavelength converting element 108 is blocked by the dichroic reflector 106 from reaching the light exit device 110. The dichroic reflector 106 is, as previously mentioned, arranged between the reflecting wavelength converting element 108 and the light exit device 110 in an optical path between the reflecting wavelength converting element 108 and the light exit device 110, and the size of the optical element 106 is configured such that the unconverted light 128 coming from the reflecting wavelength converting element 108 is re-directed back to the first light source 102. This makes it easier to match the intensity profile of the blue light 130 from the second light source 104 to the intensity profile of the converted light 126 transmitted through the optical element 106 than in the case that the blue light 128 is not blocked. However, it is also possible to provide a smaller optical element 106 and still match the intensity profile of the blue light 130 originating from the second light source 104 in combination with the beam shaping element 116.

The white light source 100 further comprises a first collimator lens 112 arranged in an optical path between the first light source 102 and the optical element 106. The first collimator lens 112 collimates the first light 124 emitted in use by the first light source 102 to the dichroic reflector 106. The white light source 100 also further comprise a second collimator lens 114 arranged in an optical path between the second light source 104 and the dichroic reflector 106. The second collimator lens 114 collimates the blue light 130 emitted from the second light source 104 to the dichroic reflector 106. Collimating the light from the first light source 102 and second light source 104 enables an improved proper functioning of the dichroic reflector 106.

The white light source 100 further comprises a focus lens 118 arranged in an optical path between the reflecting wavelength converting element 108 and the dichroic reflector 106. The focus lens 118 is configured to focus the light directed to the reflecting wavelength converting element 108, and collimate the converted light 126 and the reflected unconverted light 128 to the dichroic reflector 106.

The white light source 100 further comprises a focus lens 120 arranged in the optical path between the optical element 106 and the light exit device 110. The focus lens 120 is arranged to focus light directed to the light exit device 120 so that light is coupled into the light exit device 110.

In case the light exit device 110 is an optical fiber, a low bending radius of the optical fiber is advantageous. The minimum bending radius of a fiber is in general proportional to its core or cladding diameter. The minimum bending radius is in the order of magnitude of 100 to 500 times the core or cladding diameter. The diameter of the optical fiber is in practice in the order of 0.5 mm to 1 mm. The diameter of the light beam in front of the optical fiber is, amongst others, determined by the focus lens 120. The focus lens may introduce chromatic aberration, or other optical artefacts, thereby resulting in an increase (with respect to an ideal focus lens) of the diameter of the light beam entering the optical fiber. This increase of the diameter of the beam of the light entering the optical fiber should preferably be less than half of the diameter of the optical fiber, more preferably less than a quarter of the diameter of the optical fiber and most preferably less than a tenth of the diameter of the optical fiber in order to provide for an efficient in-coupling of light into the optical fiber. Optical simulations were performed to calculate a relation between the (maximum) optical diameter of the focus lens 120 and the diameter of the optical fiber 110 which provides for an optimum in-coupling of light from the focus lens 120 into the optical fiber 110. The optical simulations show that, for an optimum in-coupling of light into the optical fiber, a ratio of the diameter of the optical fiber 110 to the optical diameter of the focus lens 120 should be preferably less than 21, more preferably less than 10 and most preferably less than 4.2.

The white light source 100 further comprises a beam shaping element 116 arranged in an optical path between the second light source 104 and the optical element 106. In particular, the beam shaping element 116 is arranged between the second light source 104 and the second collimator lens 114. The beam shaping element 116 is adapted to adjust the intensity profile of the blue light 130 emitted by the second light source 104 to match the intensity profile of the converted light 126 transmitted through the dichroic reflector 106. The beam shaping element 116 shown in FIG. 1 is a holographic diffusor plate with a Gaussian intensity profile. The full width at half maximum, FWHM, of the holographic diffusor plate is configured to provide the matching intensity profile. For example, the FWHM can be configured to be 15°, 20°, 30° or 40°. Experiments have shown that a FWHM of 15° can provide an intensity profile of the blue light 130 from the second light source 104 matched to the intensity profile of the converted light 126 transmitted through the optical element 106. Matching the intensity profile of the blue light 130 emitted in use by the second light source 104 to the intensity profile of the converted yellow 126 light being transmitted through the optical element 106 generates uniform white light with a substantially uniform color point. Other types of beam shaping element may also be used advantageously within the scope of the invention such as a lens, a toroidal lens, a lens in combination with a beam shaping prism, a diffractive grating structure, a blazed diffractive grating structure, a diffusor plate, or holographic beam shaping elements such as a holographic diffusor plate.

In use, the first light source 102 emits first light 124 which is collimated by the first collimator lens 112 and directed to the first side 105 of the dichroic reflector 106. The dichroic reflector 106 re-directs, in this case by reflection at the first side 105, the collimated first light 124 from the first light source 102 to the reflecting wavelength converting element 108 via the focus lens 118. The light from the first light source 102 is focused by the focus lens 118 onto the reflecting wavelength converting element 108. The light is at least partly converted into converted light by the reflecting wavelength converting element 108. The converted light 126 is emitted from the reflecting wavelength converting element 108, via the focus lens 118, to the first side 105 of the optical element 106. The converted light is then transmitted through the optical element 106 and focused onto the light exit device 110 by the focus lens 120. The blue unconverted light 128 from the reflecting wavelength converting element 108 is also reflected back to the first side 105 of the optical element 106 via the focus lens 118. The optical element 106 then re-directs the unconverted light 128. The unconverted light 128 is thus blocked by the dichroic reflector 106 from reaching the light exit device 110. If the converted light 126 comprises blue components, those components are also re-directed by the optical element 106 and blocked from reaching the light exit device 110.

Further, the second light source 104 simultaneously emits blue light 130. The blue light 130 emitted from the second light source 104 is beam-shaped by the beam shaping element 116, collimated by the second collimator lens 114, and directed to second side 107 of the dichroic reflector 106. The dichroic reflector 106 re-directs, through reflection at the second side 107, the beam-shaped and collimated blue light 130 from the second light source 104 to the light exit device 110 via the focus lens 120. The converted light 126 from the reflecting wavelength converting element 108 is combined with the beam-shaped and collimated blue light 130 from the second light source 104 and generates uniform white light which enters the light exit device 110. As the intensity profile of the beam-shaped and collimated blue light 130 emitted by the second light source 104 matches the intensity profile of the converted light 126, the white light generated by the white light source 100 entering the light exit device 110 has a substantially uniform color point.

The light exit device 110 then guides, in use, the white light generated by the white light source 100 to an application of the white light such as e.g. spots, stage-lighting, headlamps and digital light projection.

In an alternative arrangement (not shown) the optical element 106 is adapted to re-direct converted light and to transmit first light and blue light. Compared to the arrangement of the components of the white light source 100 shown in FIG. 1, the second light source 104 with the beam shaping element 116 and the collimator lens 114 thus switches their placement with the reflecting wavelength converting element 108 and the focus lens 118. With such an alternative arrangement the light 124 emitted by the first light source 102 is transmitted through the optical element 106 to the reflecting wavelength converting element 108. The converted light from the reflecting wavelength converting element 108 is re-directed by the optical element 106 to the light exit device 110. The blue light 130 emitted by the second light source 104 is transmitted through the optical element 106 to the light exit device 110.

Figure 2:
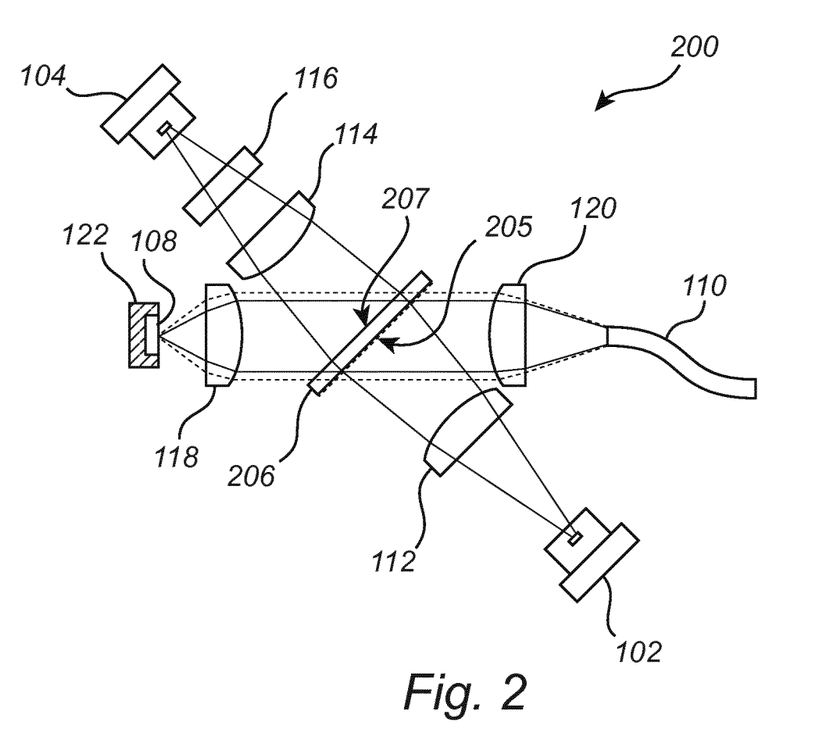
FIG. 2 is a schematic view of a white light source according to another embodiment of the invention.

FIG. 2 shows a schematic view of a white light source 200 according to another embodiment of the invention. The white light source 200 shown in FIG. 2 is similar to the white light source 100 shown in FIG. 1, and in general comprises the same components. However, a difference between the white light source 200 in FIG. 2 and the white light source 100 in FIG. 1 is that the optical element 206 adapted to re-direct blue light and transmit yellow light is embodied by a blazed grating 206. The blazed grating 206 has a first side 205 and a second side 207 opposite the first side 205. The blaze wavelength of the blazed grating is configured to correspond to the wavelength of the light emitted by the first and second light sources 102, 104. The grating of the blazed grating 206 is arranged on the first side 205.

Note that the first light source 102 is arranged so that the light emitted by the first light source 102 is incident upon the first side 205 of the blazed grating 206 substantially parallel to the normal of the first side 205. Likewise, the second light source 104 is arranged so that the blue light emitted by the second light source 104 is incident upon the second side 207 of the blazed grating 206 substantially parallel to the normal of the second side 207.

In use, the first light source 102 emits light which is collimated by the first collimator lens 112 and directed to the first side 205 of the blazed grating 206. The light from the first light source 102 is re-directed by the blazed grating 206 to the reflecting wavelength converting element 108 via the focus lens 118. The angle to which the light is re-directed corresponds to the blaze angle of the blazed grating 206. Hence, the blazed grating 206 and the first light source 102 are arranged so that the re-direction of the light from the first light source 102 results in light being re-directed to the reflecting wavelength converting element 108, and the re-direction of blue light from the second light source 104 results in blue light being re-directed to the light exit device 110.

The light from the first light source 102 is at least partly converted into converted light by the reflecting wavelength converting element 108. The converted light is reflected back from the reflecting wavelength converting element 108, via the focus lens 118, to the second side 207 of the blazed grating 206. The converted light is transmitted through the blazed grating 206 from the second side 207 to the first side 205 and to the light exit device 110 via the focus lens 120. Blue light is also reflected back to the second side 207 of the blazed grating 206 via the focus lens 118. The blazed grating 206 then re-directs the blue light from the reflecting wavelength converting element 108 towards the first light source 102. The blue light, unconverted or emitted, from the reflecting wavelength converting element 108 is thus blocked from reaching the light exit device 110 by the blazed grating 206.

The second light source 104 simultaneously emits blue light which is beam-shaped by the beam shaping element 116 and collimated by the second collimator lens 114, and directed to the blazed grating 206. The blazed grating 206 re-directs, in this case by transmitting the blue light from the second side 207 to the first side 205 and re-directing the blue light from the second light source 104 to the light exit device 110 via the focus lens 120. The converted light from the reflecting wavelength converting element 108 is combined with the blue light from the second light source 104 to generate uniform white light having a substantially uniform color point which enters the light exit device 110.

Figure 3:
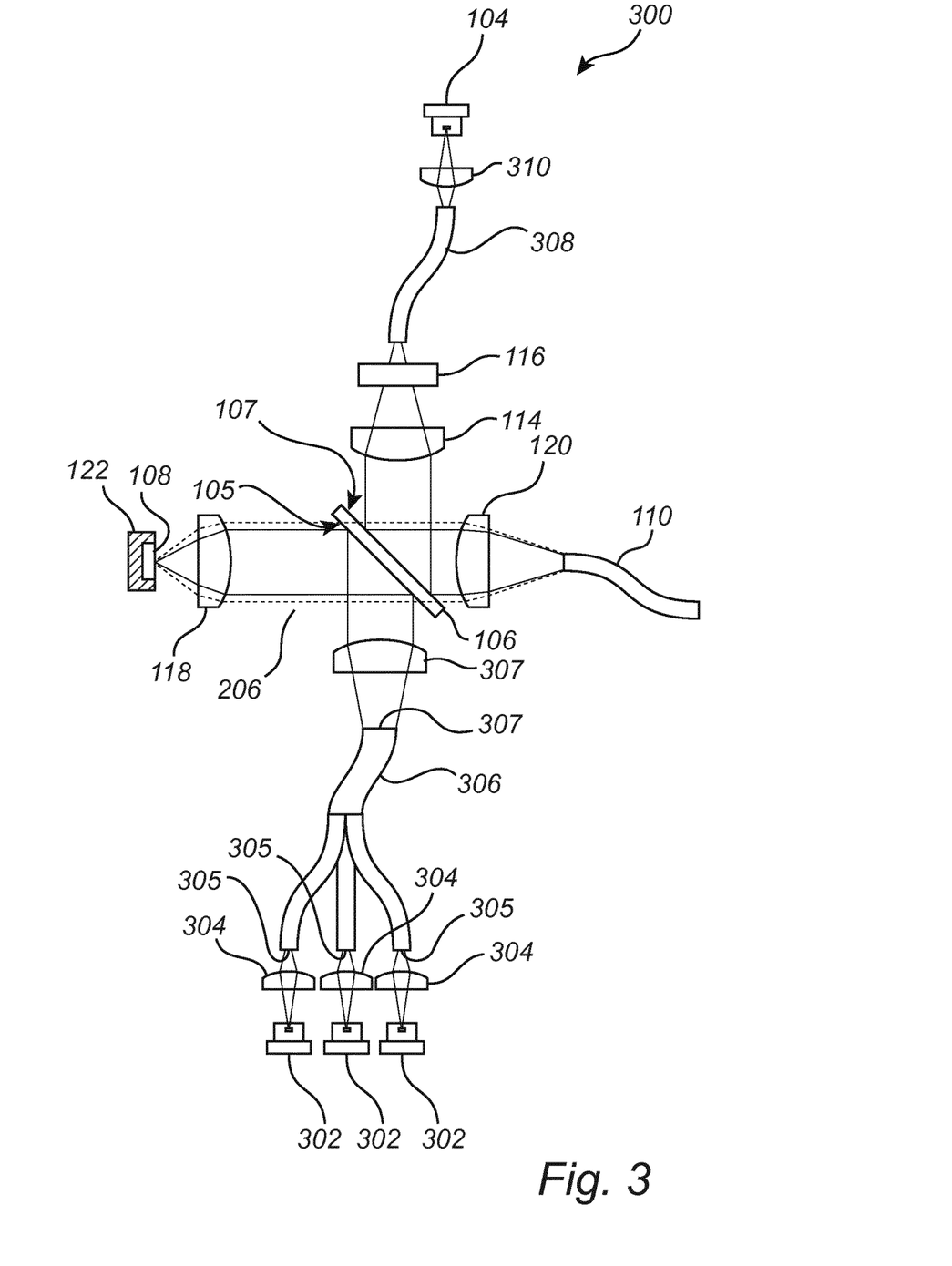
FIG. 3 is a schematic view of a white light source according to yet another embodiment of the invention.

FIG. 3 shows a schematic view of a white light source 300 according to yet another embodiment of the invention. The white light source shown in FIG. 3 is in general similar to the white light source 100 shown in FIG. 1 and in general comprises similar components. However, the optical element 106 shown in FIG. 3 is a mirror filter plate which allows light with a wavelength longer than 500 nm to be transmitted through the mirror filter plate 106 and re-directs, by reflection, light with a wavelength shorter than 500 nm. The mirror filter plate has a first side 105 and an opposite second side 107.

Further, the white light source 300 comprises a plurality of first light sources 302, shown in FIG. 3 as three light sources 302. It should be noted that it is of course also possible to use two light sources or more than three light sources. The white light source 300 further comprises means for combining the light emitted by the plurality of light sources 302, embodied in FIG. 3 by a branched optical fiber 306 arranged in an optical path between the plurality of first light sources 302 and the mirror filter plate 106. The branched optical fiber 306 comprises a plurality of light entrance ends 305 and a common light exit end 307 opposite the light entrances ends 305. The white light source 300 also further comprises coupling lenses 304 arranged in an optical path between each of the first light sources 302 and each of the light entrance ends 305. The coupling lenses 304 couple the light emitted from each of the first light sources 302 into a corresponding light entrance end 305 of the branched optical fiber 306. The branched optical fiber 306 has three light entrance ends 305 in order to combine the light from each of the first light sources 302 and emit the combined light from the light exit end 307 to the optical element 106 via collimator lens 112. The light entrance ends 305 of the branched optical fiber 306 can be combined by splicing or coupling them together.

The branched optical fiber 306 with the separate light entrance ends 305 allows each of the first light sources 302 to be placed apart from each other. Thereby, each of the first light sources 302 can be cooled separately and reduces the concentration of heat-generating components in the white light source 300.

The white light source 300 also comprises an optical fiber 308 arranged in an optical path between the second light source 104 and the beam shaping element 116. Further, there is a coupling lens 310 arranged to couple the light emitted in use by the second light source 104 into the optical fiber 308. The optical fiber 308 is arranged such that in use the blue light emitted by the second light source 104 is coupled into the optical fiber 308 and directed by the second optical fiber 308 to the beam shaping element 116. In this way, the optical fiber 308 allows alternative placements of the second light source 104 in relation to the beam shaping element 116.

In use, the plurality of first light sources 302 emit light which is coupled by the coupling lenses 304 into the light entrance ends 305 of the branched optical fiber 306. The branched optical fiber 306 combines the light from the plurality of first light sources 302 and emits the combined light from the light exit end 307 to the first side 105 of the mirror filter plate 106 via the first collimator lens 112. The first collimator lens 112 collimates the combined light from the first optical fiber 306. The combined and collimated light is reflected by the mirror filter plate 106 to the reflecting wavelength converting element 108 via the focus lens 118. The combined and collimated light from the plurality of first light sources 302 is focused by the focus lens 118 onto the reflecting wavelength converting element 108. The light from the plurality of first light sources 302 is at least partly converted into converted light by the reflecting wavelength converting element 108 and reflected back, through the focus lens 118, to the mirror filter plate 106. The converted light is transmitted through the mirror filter plate 106 to the light exit device 110 via the focus lens 120. The blue light coming from the reflecting wavelength converting element 108 is blocked from reaching the light exit device 110 as the mirror filter plate 106 reflects the blue light coming from the reflecting wavelength converting element 108.

Further, the second light source 104 simultaneously emits blue light. The blue light emitted from the second light source 104 is coupled by the coupling lens 310 into the optical fiber 308 which directs the blue light from the second light source 104 to the beam shaping element 116. The blue light from the second light source 104 is beam-shaped by the beam shaping element 116 to provide an intensity profile which matches the intensity profile of the converted light which is transmitted through the mirror filter plate 106. Then, the beam-shaped blue light from the second light source 104 is collimated by the second collimator lens 114, and directed to the second side 107 of the mirror filter plate 106. The beam shaped and collimated blue light from the second light source 104 is reflected at the second side 107 of the mirror filter plate 106 to the light exit device 110 via the focus lens 120. The converted light from the reflecting wavelength converting element 108 is thus combined with the beam-shaped blue light from the second light source 104 to generate uniform white light entering the light exit device 110.

Figure 4:
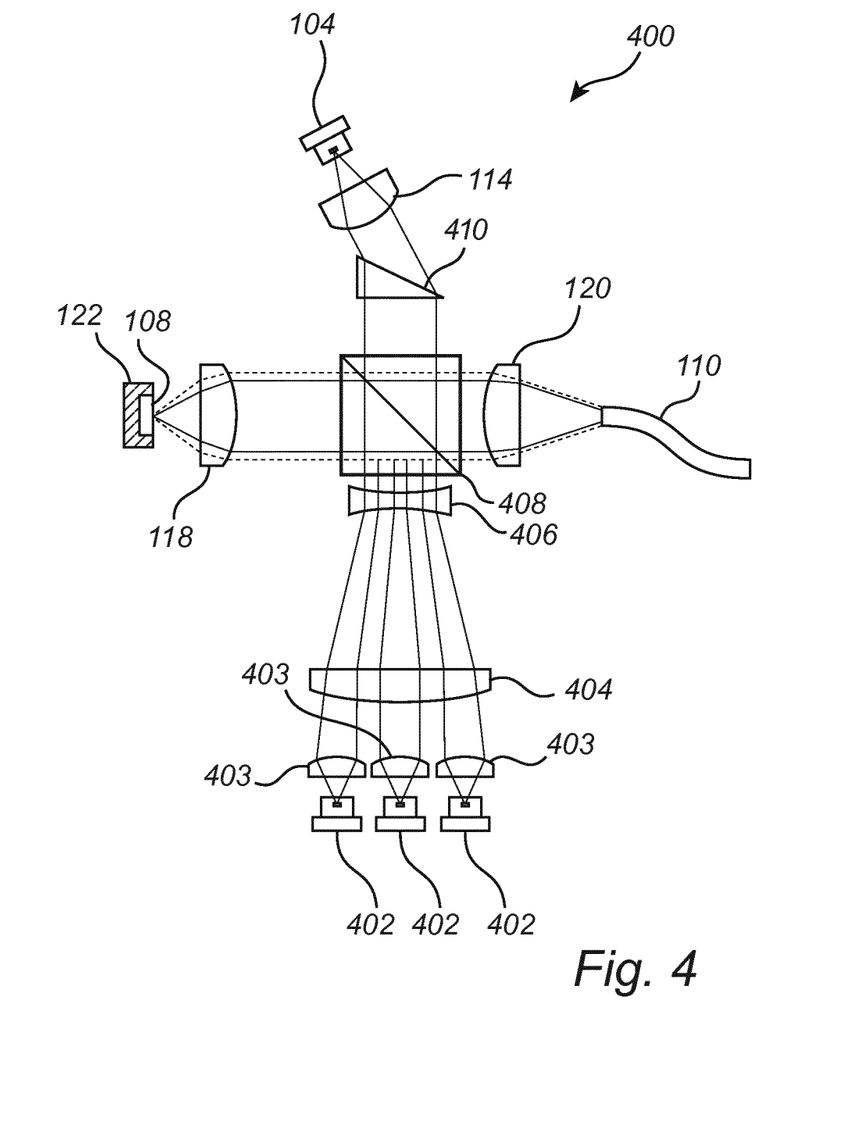
FIG. 4 is a schematic view of a white light source according to yet another embodiment of the invention.

FIG. 4 shows a schematic view of a white light source 400 according to another embodiment of the invention. The white light source 400 shown in FIG. 4 is in general similar to the white light source 300 shown in FIG. 3 and comprises a plurality of first light sources 402 and means for combining the light from the plurality of first light sources 402. However, in the white light source 400 the means for combining the light from the plurality of first light sources 402 is a first relay lens 404 and a second relay lens 406 arranged in an optical path between the plurality of first light sources 402 and the element 106. Further, the optical element 106 shown in FIG. 4 is a polarizing beam splitter 106 (PBS) which re-directs light with a first linear polarization and transmits light with a second linear polarization which is perpendicular to the first polarization and may also have color selectivity. The color selectivity may be provided by designing the polarizing beam splitter 408 with an additional layer having wavelength selective characteristics. Hence, the light emitted in use by the first and second light sources 102, 104 is configured to substantially comprise the first same state of linear polarization and thus will be re-directed by reflection in the polarizing beam splitter 106. Further, the beam shaping element 116 of the white light source 400 is a beam shaping prism 116.

The white light source 400 further comprises a plurality of collimator lenses 403 arranged to collimate the light emitted by each of the first light sources 402, and direct the light to the first relay lens 404.

In use, the plurality of first light sources 402 emits light which is collimated by the collimator lenses 403 and directed to the first relay lens 404. The first relay lens 404 directs the light from the first light sources 402 to the second relay lens 406 which collimates the light to direct parallel beams of light to the polarizing beam splitter 408. The polarizing beam splitter 408 re-directs the light from the first light sources 402 to the reflecting wavelength converting element 108 via the focus lens 118.

The light from the plurality of first light sources 402 is focused by the focus lens 118 onto the reflecting wavelength converting element 108. The light is at least partly converted by the reflecting wavelength converting element 108 and reflected back, through the focus lens 118, to the polarizing beam splitter 408. The converted light does not have the same polarization as the light from the first and second light sources 402, 104 and is thus transmitted through the polarizing beam splitter 408 to the light exit device 110 via the focus lens 120 as the polarizing beam splitter has a color selectivity and reflects blue light while transmitting components of the converted light which is not blue. The blue light coming from the reflecting wavelength converting element 108 will be partially blocked from reaching the light exit device 110 as the polarizing beam splitter 408 again re-directs part of the light which has the same state of polarization as the blue light due to its polarization sensitivity.

The second light source 104 simultaneously emits blue light. The blue light emitted from the second light source 104 is collimated by the collimator lens 114 and directed to the beam shaping prism 410. The blue light from the second light source 104 is beam-shaped by the beam shaping prism 410 to provide an intensity profile which matches the intensity profile of the converted light which is transmitted through the polarizing beam splitter 408. The polarizing beam splitter 408 re-directs the blue light from the second light source 104 to the light exit device 110 via the focus lens 120. Thereby, the converted light and the beam-shaped blue light from the second light source 104 are combined to generate uniform white light.

Figure 5:
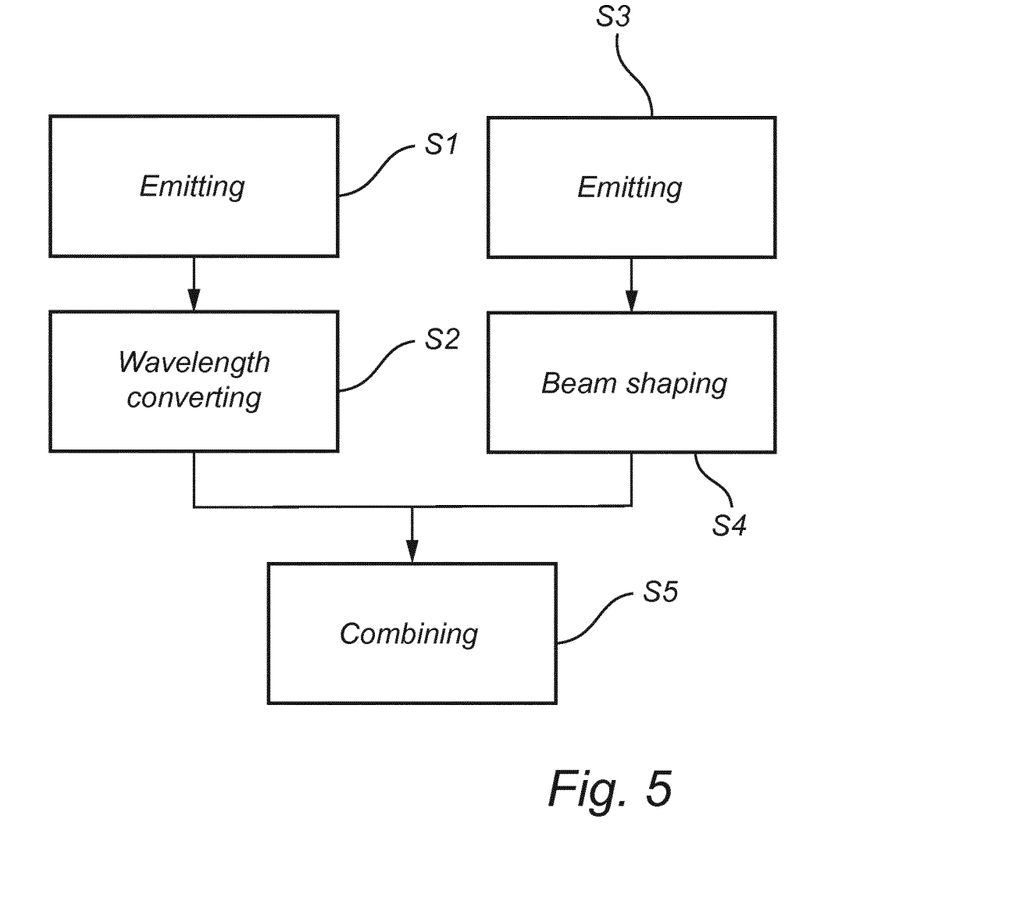
FIG. 5 is a flow chart showing steps of a method for generating white light using a white light source according to an embodiment of the invention.

FIG. 5 is a flow chart showing steps of a method for generating white light according to an embodiment of the invention. The method may for example be implemented in a white light source such as the white light sources 100, 200, 300, 400 shown in FIGS. 1-4.

Step S1 comprises emitting first light from a first light source 102 to a reflecting wavelength converting element 108.

Step S2 comprises wavelength converting, at least partly, the first light from the first light source 102 with the reflecting wavelength converting element 108 into converted light. The converted light has a different wavelength, typically longer than the light emitted from the first light source 102 in step S1. For example, the converted light may be yellow.

Step S3, comprises emitting blue light from the second light source 104.

Step S4, comprises beam shaping the blue light from the second light source 104 to adjust the intensity profile of the blue light emitted by the second light source 104 to match the intensity profile of the converted light. The blue light from the second light source 104 may be beam-shaped by a suitable beam shaping element 116 such as a lens, a lens in combination with a beam shaping prism, a diffractive grating structure, a blazed diffractive grating structure, a diffusor plate, or a holographic diffusor plate.

Steps S1-S2 occur concurrently with steps S3-S4.

Step S5 comprises combining the converted light with the beam-shaped blue light from the second light source 104 to generate the white light. The white light generated according to the inventive concept thus comprises a component of converted light, and a component of blue light which has been beam-shaped to adjust the intensity profile to match the intensity profile of the converted light. Thereby, the method generates uniform white light. In particular, the uniform white light may have a substantially uniform color point and provides illumination substantially without color deviations over the surface of an illuminated area.

The white light source according to the embodiments described above may provide a color point variation over a cross section of the generated white light less than 40 sdcm, preferably less than 20 sdcm, or more preferably less than 5 sdcm (sdcm stands for Standard Deviation of Color Matching).

The white light source according to the embodiments described above may provide a color rendering index (CRI) of the generated white light of at least 40.

The white light source according to the embodiments described above may provide a correlated color temperature (CCT) of the generated white light in the range of 3000-8000K.

The white light source according to the embodiments described above may further comprise a detector adapted to measure the intensity of the blue light from the second light source and the intensity of the converted light, and means for adjusting the intensity of blue light from the second light source and/or the intensity of the converted light based on the detected intensity. The light sources may degrade over time, and the color point of the generated white light can thus be kept constant over the lifetime of the light sources by detecting and adjusting the intensity of the light emitted by the light sources.

The white light source may be incorporated in an automotive headlamp. Alternatively, the white light source may for example be incorporated in a stadium light (e.g. floodlight), a (digital) projector, stage light, luminaire or a street light.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination may not be used to an advantage.

The invention claimed is:

1. A white light source, comprising:
    a first light source adapted to emit first light;
    a reflecting wavelength converting element arranged to receive first light from the first light source and at least partly convert it to converted light; and
    a second light source adapted to emit blue light which in use combines with the converted light to generate white light;
    wherein the white light source further comprises a beam shaping element adapted to adjust the intensity profile of the blue light emitted by the second light source to match the intensity profile of the converted light.

2. A white light source according to claim 1, wherein the size of the reflecting wavelength converting element is configured to match the size of the incoming first light.

3. A white light source according to claim 1, further comprising:
    an optical element adapted to re-direct first light and blue light, and transmit converted light; and
    a light exit device, wherein the beam shaping element is arranged in an optical path between the second light source and the optical element, and
    wherein the white light source is arranged so that in use the first light emitted by the first light source is re-directed by the optical element to the reflecting wavelength converting element, the converted light is transmitted through the optical element to the light exit device, and the blue light emitted by the second light source is re-directed by the optical element to the light exit device.

4. A white light source according to claim 3, wherein the optical element is sized so that blue light from the reflecting wavelength converting element is blocked by the optical element from reaching the light exit device.

5. A white light source according to claim 3, wherein the optical element is selected from the group consisting of a dichroic reflector, multi-layer reflectors, a mirror filter plate, a grating, a blazed grating, a photonic crystal reflector, a cholesteric reflector, a wire grid polarizer, a reflective polarizer and a polarizing beam splitter.

6. A white light source according to claim 3, arranged such that in use the light emitted by the first light source is directed to on a first side of the optical element and the blue light emitted by the second light source is directed to on a second, opposite side of the optical element.

7. A white light source according to claim 1, wherein the beam shaping element is selected from the group consisting of a lens, a toroidal lens, a lens in combination with a beam shaping prism, a diffractive grating structure, a blazed diffractive grating structure, a diffuser plate, and a holographic diffuser plate.

8. A white light source according to claim 1, wherein the color point variation over a cross section of the generated white light is less than 40 sdcm, preferably less than 20 sdcm, more preferably less than 5 sdcm.

9. A white light source according to claim 1, wherein the color rendering index of the generated white light is at least 40.

10. A white light source according to claim 1, wherein the correlated color temperature of the generated white light is in the range of 3000-8000 K.

11. A white light source according to claim 1, wherein the first light source comprises a plurality of first light sources, and wherein the white light source further comprises means for combining light emitted by the plurality of first light sources.

12. A white light source according to claim 1, further comprising a heat sink in thermal contact with the reflecting wavelength converting element.

13. A white light source according to claim 1, further comprising:
- a detector adapted to measure the intensity of the blue light from the second light source and the intensity of the converted light; and
- means for adjusting the intensity of the blue light from the second light source and/or the intensity of the converted light based on the detected intensity.

14. A white light source according to claim 1, incorporated in an automotive head lamp.

15. A method for generating white light, comprising the steps of:
- emitting first light from a first light source to a reflecting wavelength converting element;
- wavelength converting, at least partly, the first light from the first light source with the reflecting wavelength converting element into converted light;
- emitting blue light from a second light source;
- beam shaping the blue light from the second light source to adjust the intensity profile of the blue light emitted by the second light source to match the intensity profile of the converted light; and
- combining the converted light with the beam-shaped blue light from the second light source to generate the white light.

16. The method according to claim 15, further comprising the step of re-directing the first light from the first light source to the reflecting wavelength converting element using an optical element.

17. The method according to claim 16, further comprising the step of re-directing the blue light from the second light source to a light exit device using the optical element.

18. The method according to claim 15, wherein the step of beam shaping the blue light from the second light source comprises using a diffusor plate.

19. An apparatus for providing a white light source, comprising:
- a first light source adapted to emit first light;
- a reflecting wavelength converting element arranged to receive first light that has been re-directed from the first light source and at least partly convert it to converted light;
- a second light source adapted to emit blue light which in use combines with the converted light to generate white light; and
- an optical element adapted to block blue light from the reflecting wavelength converting element;
- wherein the white light source further comprises a beam shaping element adapted to adjust the intensity profile of the blue light emitted by the second light source to match the intensity profile of the converted light.

20. The apparatus of claim 19, wherein the second light source is re-directed by the optical element to a light exit device.

* * * * *